(12) United States Patent
Yun et al.

(10) Patent No.: US 12,306,404 B2
(45) Date of Patent: May 20, 2025

(54) WAVEGUIDE-TYPE DISPLAY DEVICE (71) Applicants: SAMSUNG ELECTRONICS CO., LTD., Suwon-si (KR); SEOUL NATIONAL UNIVERSITY R&DB FOUNDATION, Seoul (KR)

(72) Inventors: Jeonggeun Yun, Suwon-si (KR); Byoungho Lee, Seoul (KR); Kiseung Bang, Seoul (KR); Chanhyung Yoo, Seoul (KR); Kyookeun Lee, Suwon-si (KR); Minseok Chae, Seoul (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 184 days.

(21) Appl. No.: 17/879,469

(22) Filed: Aug. 2, 2022

(65) Prior Publication Data

US 2022/0390749 A1    Dec. 8, 2022

Related U.S. Application Data

(63) Continuation of application No. PCT/KR2021/000735, filed on Jan. 19, 2021.

(30) Foreign Application Priority Data

Mar. 11, 2020 (KR) .................. 10-2020-0030378

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0056* (2013.01); *G02B 27/0081* (2013.01);
(Continued)

(58) Field of Classification Search
CPC .. G02B 6/0033; G02B 6/0035; G02B 6/0056; G02B 27/0081; G02B 27/01;
(Continued)

(56) References Cited

U.S. PATENT DOCUMENTS 9,671,615 B1    6/2017 Vallius et al.
11,009,737 B1 *  5/2021 Matsuda ........... G02F 1/133504
(Continued)

FOREIGN PATENT DOCUMENTS

KR    10-2016-0032656 A    3/2016
KR    10-2019-0063443 A    6/2019

OTHER PUBLICATIONS

Communication dated Apr. 26, 2021 issued by the International Searching Authority in counterpart Application No. PCT/KR2021/000735 (PCT/ISA/220, PCT/ISA/210, and PCT/ISA/237).
(Continued)

*Primary Examiner* — Daniel Petkovsek
*Assistant Examiner* — Emma R. Oxford
(74) *Attorney, Agent, or Firm* — Sughrue Mion, PLLC (57) ABSTRACT

Provided is a waveguide-type display device including a waveguide, an input coupler provided on the waveguide and configured to transmit an image to travel into the waveguide, an output coupler provided on the waveguide and configured to output the image traveling in the waveguide to an outside of the waveguide, and a field-of-view (FOV) expander configured to output an image having an expanded FOV by
(Continued)

deflecting and outputting the image output from the output coupler in a certain direction based on polarization characteristics of the image.

14 Claims, 8 Drawing Sheets

(51) Int. Cl.
    *G02B 27/00*     (2006.01)
    *G02B 27/28*     (2006.01)

(52) U.S. Cl.
    CPC .... *G02B 27/283* (2013.01); *G02B 2027/0118* (2013.01); *G02B 2027/0123* (2013.01); *G02B 2027/0134* (2013.01)

(58) Field of Classification Search
    CPC .............. G02B 27/017; G02B 27/0172; G02B 27/283; G02B 2027/0123; G02B 2027/0125; G02B 2027/0134; G02B 2027/0174; G02B 2027/0178
    See application file for complete search history.

(56) References Cited

U.S. PATENT DOCUMENTS

| | | |
|---|---|---|
| 2016/0011353 A1* | 1/2016 | Escuti ...................... G02B 5/32 359/15 |
| 2016/0077335 A1 | 3/2016 | An et al. |
| 2017/0045742 A1 | 2/2017 | Greenhalgh et al. |
| 2018/0234675 A1* | 8/2018 | Cheng ................ G02B 27/0172 |
| 2018/0239177 A1* | 8/2018 | Oh ........................ G02B 6/0076 |
| 2019/0285891 A1* | 9/2019 | Lam ..................... G02B 27/286 |
| 2020/0049872 A1* | 2/2020 | Peng .................... G02B 27/283 |
| 2020/0049996 A1 | 2/2020 | Yan et al. |
| 2020/0057304 A1* | 2/2020 | Lu ...................... G02B 27/0172 |
| 2020/0064641 A1 | 2/2020 | Lam et al. |
| 2020/0081252 A1* | 3/2020 | Jamali .................. G02B 5/1828 |
| 2021/0247632 A1* | 8/2021 | Robbins ............. G02F 1/133504 |
| 2021/0405374 A1* | 12/2021 | Komanduri ........ G02B 27/4261 |

OTHER PUBLICATIONS

Office Action dated Jan. 13, 2025, issued by Korean Patent Office in Korean Patent Application No. 10-2020-0030378.

* cited by examiner

WAVEGUIDE-TYPE DISPLAY DEVICE

CROSS-REFERENCE TO RELATED APPLICATIONS

This application is a bypass continuation application of International Application No. PCT/KR2021/000735, filed on Jan. 19, 2021, which is based on and claims the priority to Korean Patent Application No. 10-2020-0030378, filed on Mar. 11, 2020, in the Korean Intellectual Property Office, the disclosures of which are incorporated by reference herein in their entireties.

BACKGROUND

1. Field

Embodiments of the disclosure relate to a waveguide-type display device, and more particularly, to a waveguide-type display device having an expanded field of view (FOV).

2. Description of Related Art

Virtual reality (VR) refers to a technology that allows people to have a realistic experience in a virtual world created by a computer. Augmented reality (AR) refers to a technology that allows a virtual image to be blended in a physical environment or space of the real world. Near-eye displays in which VR displays or AR displays are implemented reproduce a virtual image in space by using a combination of optical and stereoscopic images. In the case of such a near-eye display, display resolution and processing are important.

A near-eye display apparatus may implement image information of a light source in a small volume by using a very thin waveguide and a diffractive optical element that arbitrarily redirects light. In addition to very thin implementation, the diffractive optical element has the property of light selectivity to respond only to light incident at a specific angle and wavelength. Accordingly, the diffractive optical element may be designed to allow light of an actual object to pass therethrough and respond only to light guided into the waveguide for use in the AR displays.

However, a major problem of the near-eye display apparatus may be a narrow field-of-view (FOV). The FOV may be mainly determined by the diffractive optical element. Due to the angular selectivity of the diffractive optical element, a diffraction phenomenon may occur only in the case of light incident within a specific angle range, and light incident outside this angle range may mostly pass through the diffractive optical element. Generally, a field-of-view (FOV) range of a display apparatus using a waveguide is relatively low and about 30 to 60 degrees.

SUMMARY

Embodiments provide a waveguide-type display device including an optical element capable of expanding a field of view (FOV).

According to an aspect of an embodiment, there is provided a waveguide-type display device including a waveguide, an input coupler provided on the waveguide and configured to transmit an image to travel into the waveguide, an output coupler provided on the waveguide and configured to output the image traveling in the waveguide to an outside of the waveguide, and a field-of-view (FOV) expander configured to output an image having an expanded FOV by deflecting and outputting the image output from the output coupler in a certain direction based on polarization characteristics of the image.

The FOV expander may be further configured to deflect and output an incident image in a first direction when the incident image is of vertical linear polarization, and to deflect and output the incident image in a second direction that is different from the first direction when the incident image is of horizontal linear polarization.

The first direction and the second direction may be opposite to each other with respect to a central axis of the FOV expander.

The output coupler may be provided on a first surface of the waveguide, and the FOV expander may be provided on a second surface opposite to the first surface of the waveguide.

At least a part of the FOV expander may overlap the output coupler in a direction perpendicular to a longitudinal direction of the waveguide.

The FOV expander my include a first ¼ wave plate configured to convert the image output from the output coupler into an image of circular polarization, and a first polarization grating configured to deflect and output the image of the circular polarization, output from the first ¼ wave plate, in a direction that is different from a direction of the image output from the first ¼ wave plate, based on a rotational direction of the circular polarization.

The waveguide-type display device may further include an external light compensator configured to deflect external light corresponding to an external environment in a direction opposite to light deflection of the FOV expander.

The external light compensator may be provided on a first surface of the waveguide and the FOV expander is provided on a second surface of the waveguide opposite to the first surface, and the external light compensator may overlap the FOV expander in a direction perpendicular to the longitudinal direction of the waveguide.

The external light compensator may include a circular polarizer configured to output a portion of the external light as external light of circular polarization, a second polarization grating configured to deflect and output the external light of the circular polarization, output from the circular polarizer, in a direction opposite to the deflection direction of the FOV expander, and a second ¼ wave plate configured to convert the external light of the circular polarization, output from the second polarization grating, into external light of linear polarization.

A magnitude of a deflection degree of the second polarization grating may be less than or equal to a magnitude of a deflection degree of the FOV expander.

The second ¼ wave plate may have polarization characteristics that are opposite to polarization characteristics of a ¼ wave plate included in the FOV expander.

The second polarization grating may have deflection characteristics that are same as deflection characteristics of a polarization grating included in the FOV expander.

The waveguide-type display device may further include an image device configured to provide an image of linear polarization to the input coupler.

The image device may include an image source configured to emit an image, and a polarizer configured to alternately convert the image emitted from the image source into any one of an image of vertical linear polarization and an image of horizontal linear polarization.

The image device may include a first image device configured to provide the image of the vertical linear polarization, and a second image device configured to provide the image of the horizontal linear polarization.

According to another aspect of an embodiment, there is provided a waveguide-type display device including a waveguide, an input coupler provided on the waveguide and configured to transmit an image to travel into the waveguide, an image device configured to provide an image of linear polarization to the input coupler, an output coupler provided on the waveguide and configured to output the image traveling in the waveguide to an outside of the waveguide, an external light compensator configured to deflect external light corresponding to an external environment, and a field-of-view (FOV) expander configured to output an image having an expanded FOV by deflecting and outputting the image output from the output coupler in a certain direction based on polarization characteristics of the image.

The external light compensator may be further configured to deflect the external light an opposite direction to a direction of external light deflection of the FOV expander.

The FOV expander may be further configured to deflect and output an incident image in a first direction when the incident image is of vertical linear polarization, and to deflect and output the incident image in a second direction that is different from the first direction when the incident image is of horizontal linear polarization.

The first direction and the second direction may be opposite to each other with respect to a central axis of the FOV expander.

The output coupler may be provided on a first surface of the waveguide, and the FOV expander may be provided on a second surface opposite to the first surface of the waveguide.

According to embodiments of the disclosure, by further adding a field-of-view (FOV) expander using polarization characteristics of light to a waveguide type display, an FOV of an image may be widened.

By arranging an external light compensator that offsets an optical function of the FOV expander on the waveguide, distortion of external light may be prevented.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Hereinafter, embodiments of the disclosure for illustration will be described in detail with reference to the accompanying drawings. The following embodiment of the disclosure is to specify technical matters, but is not intended to limit the scope of rights. Details that may be easily inferred from detailed description and embodiments of the disclosure by those of ordinary skill in the art will be interpreted as falling within the scope of rights. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms such as 'configured' or 'include' used herein should not be interpreted as including several components or several steps described herein, and should be interpreted that some components or some steps may not be included or additional components or steps may be further included. The term used herein such as "unit" or "module" indicates a unit for processing at least one function or operation, and may be implemented in hardware, software, or in a combination of hardware and software.

In addition, terminology, such as 'first' or 'second' used herein, can be used to describe various components, but the components should not be limited by the terms. These terms are used to distinguish one component from another component.

The term "above" or "on" may include not only "directly on/under/at left/right contactually", but also "on/under/at left/right contactlessly". Hereinafter, embodiments of the disclosure for illustration will be described in detail with reference to the accompanying drawings.

Figure 1:
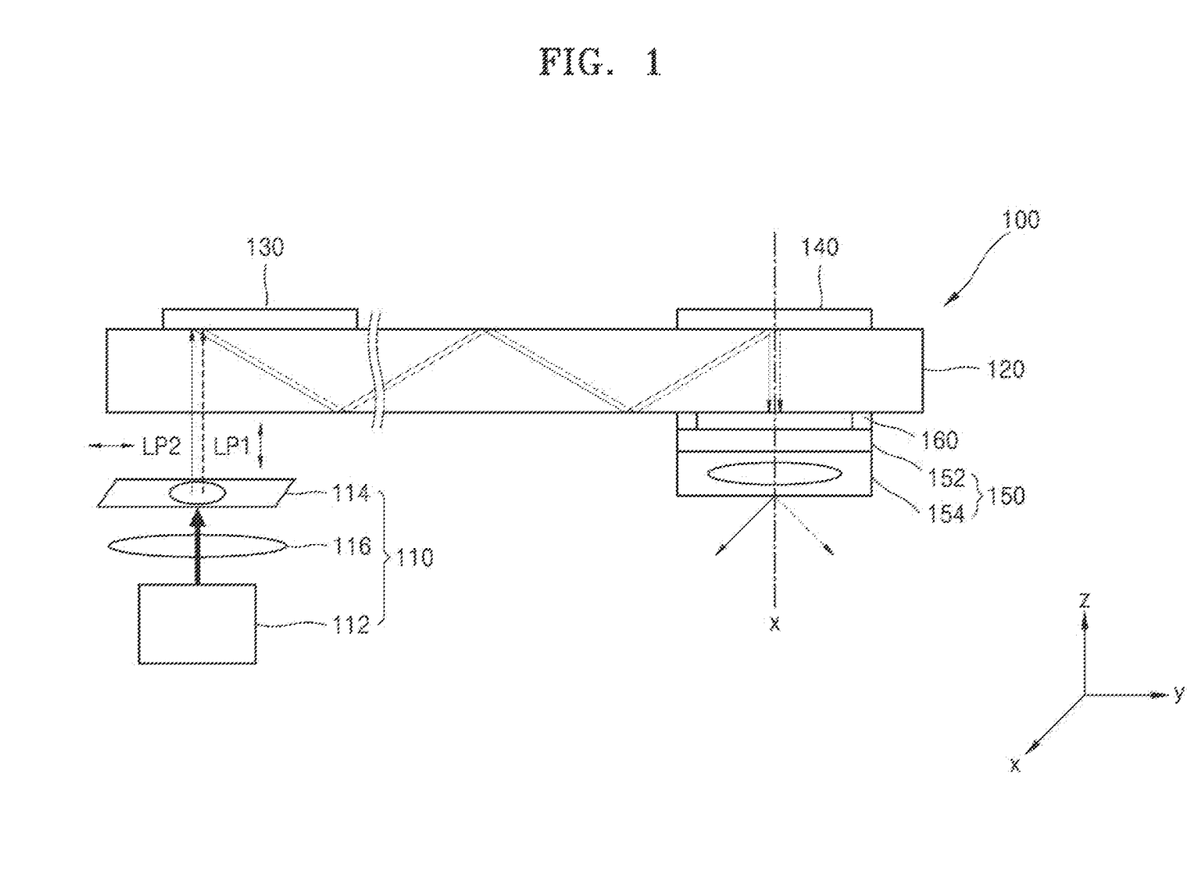
FIG. 1 schematically illustrates a waveguide-type display device according to an embodiment of the disclosure.

FIG. 1 schematically illustrates a waveguide-type display device 100 according to an embodiment of the disclosure. The waveguide-type display device 100 may be a component of a wearable device. For example, the waveguide-type display device 100 may provide an image as a head-mounted display (HMD), or simultaneously provide an image and a real environment. The HMD may be a glasses-type display or a goggle-type display.

Referring to FIG. 1, the waveguide-type display device 100 may include an image module 110 that provides light corresponding to an image (hereafter, referred to as an "image"), a waveguide 120 through which the image travels, an input coupler 130 that causes the image from the image module 110 to travel into the waveguide 120, an output coupler 140 that outputs the image traveling through the waveguide 120 to the outside of the waveguide 120, and an FOV expander 150 that deflects and outputs the image, output from the output coupler 140, in a specific direction based on polarization characteristics of the image.

The image module 110, that is an image device, may provide an image having specific polarization (e.g., linear polarization). The image module 110 may include an image source 112 that outputs an image according to an electrical signal and a polarization controller 114, that is a polarizer, that alternately converts the image output from the image source 112 into an image of first linear polarization and an image of second linear polarization.

The image source 112 may include, for example, a liquid crystal display (LCD), a liquid crystal on silicon (LCoS), an organic light-emitting diode (OLED) display, or an LED display.

The polarization controller 114 may electrically control a polarization state of the image and convert an incident image into an image of linear polarization. For example, the polarization controller 114 may alternately convert the incident image into the image of first linear polarization (e.g., an image of vertical linear polarization LP1) and the image of second linear polarization (e.g., an image of horizontal linear polarization LP2). The polarization controller 114 may include liquid crystals, etc., which may change an orientation direction according to an applied electrical signal, and may convert polarization of applied light in the oriented direction of the liquid crystals.

A lens array 116 that converts light corresponding to the image output from the image source 112 into parallel light or equalizing the light may be further included between the image source 112 and the polarization controller 114.

The waveguide 120 may allow the image to travel inside the waveguide 120 through total reflection. The waveguide 120 may be formed of a transparent member, e.g., a glass or transparent plastic material.

The image incident to the input coupler 130 may be diffracted by the input coupler 130 and may travel inside the waveguide 120 in a longitudinal direction, e.g., a y direction. The image may be incident at a perpendicular angle or oblique angle with respect to the input coupler 130.

The input coupler 130 is shown as being arranged on a left edge of a top surface of the waveguide 120, but embodiments are not limited thereto. For example, the input coupler 130 may be arranged on a bottom surface of the waveguide 120. The input coupler 130 may be a diffractive optical element or a holographic optical element that diffracts the incident image.

When the image traveling in the waveguide 120 is incident to the output coupler 140, the image may be output to the outside of the waveguide 120. The output coupler 140, similar to the input coupler 130, may be a diffractive optical element or a photographic optical element that diffracts a part of the incident image.

The FOV expander 150 may deflect and output the image, output from the output coupler 140, in a specific direction according to the polarization characteristics of the image. For example, when the image is a linearly polarized image in a first direction, the FOV expander 150 may deflect and output the image in a second direction, and when the image is a linearly polarized image in a third direction that is different from the first direction, the FOV expander 150 may deflect and output the image in a fourth direction that is different from the second direction. Herein, the linearly polarized image in the first direction and the linearly polarized image in the second direction may be perpendicular to each other, and the second direction and the fourth direction may be opposite or symmetric to each other with respect to a central axis x of the FOV expander 150. For example, the linearly polarized image in the first direction may be the image of vertical linear polarization LP1, and the linearly polarized image in the second direction may be the image of horizontal linear polarization LP2. Deflection in the second direction may be right deflection, and deflection in the fourth direction may be left deflection.

The FOV expander 150 may be arranged to oppose the output coupler 140 with the waveguide 120 between the FOV expander 150 and the output coupler 140. For example, the output coupler 140 may be arranged on a first surface (e.g., top surface) of the waveguide 120, and the FOV expander 150 may be arranged on a second surface (e.g., bottom surface) facing the first surface of the waveguide 120. At least a part of the FOV expander 150 may overlap the output coupler 140 in a direction perpendicular to the longitudinal direction of the waveguide 120, that is, the z direction. Thus, the image output from the output coupler 140 may be incident to the FOV expander 150.

The FOV expander 150 may be arranged spatially apart from the waveguide 120. For example, a spacer 160 may be further arranged between the FOV expander 150 and the waveguide 120 to spatially separate the FOV expander 150 from the waveguide 120. By arranging the FOV expander 150 not to contact the waveguide 120, a total reflection condition may be maintained and unwanted diffracted light that may be generated from the FOV expander 150 may be prevented.

The FOV expander 150 may include a first ¼ wave plate 152 that converts the image output from the output coupler 140 into an image of circular polarization and a first polarization grating that deflects the image of circular polarization, output from the first ¼ wave plate 152, in different directions according to a rotational direction of circular polarization. The first ¼ wave plate 152 may convert an incident image into circular polarization having a different rotational direction according to characteristics of linear polarization of the incident image. Polarization conversion of the first ¼ wave plate 152 may be determined by an optical axis of a ¼ wave plate. For example, the first ¼ wave plate 152 may convert the image of vertical linear polarization LP1 into the image of right-handed circular polarization RCP and convert the image of horizontal linear polarization LP2 into the image of left-handed circular polarization LCP. However, embodiments are not limited thereto. The light conversion characteristics of the first ¼ wave plate 152 may change according to a direction of the optical axis.

The first polarization grating 154 may deflect and output an image of circular polarization in a different direction depending on the rotational direction of the circular polarization. The first polarization grating 154, which is a diffractive optical element formed by patterning a thin film having optical anisotropy, may include liquid crystals oriented in a specific direction. A polarization direction may be determined according to orientation characteristics of the liquid crystals. The first polarization grating 154 may deflect the image in opposite directions with respect to the central axis x of the FOV expander 150. For example, the first polarization grating 154 may convert the image of right-handed circular polarization RCP into the image of left-handed circular polarization LCP and deflect and output the image of left-handed circular polarization LCP to the right, and may convert the image of left-handed circular polarization LCP into the image of right-handed circular polarization RCP and deflect and output the image of right-handed circular polarization RCP to the left. However, embodiments are not limited thereto. Deflection characteristics of a polarization grating may be changed according to alignment of liquid crystals.

Light output from the first polarization grating 154 may be deflected in different directions, such that the FOV expander 150 may output an image with a wider FOV than that of an image incident thereto.

Figure 2A:
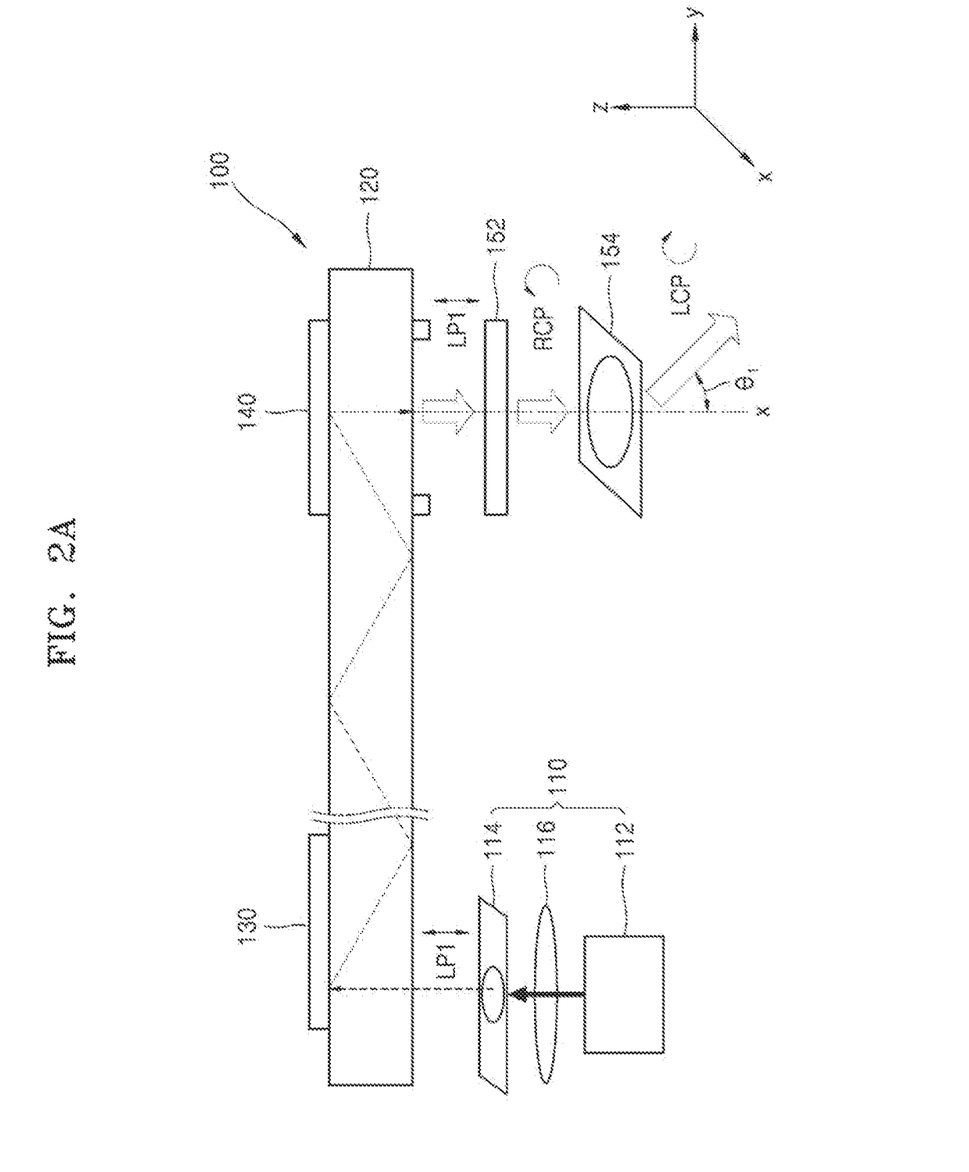
FIG. 2A is a reference diagram illustrating a method of outputting an image of vertical linear polarization, according to an embodiment of the disclosure.

FIG. 2A is a reference diagram illustrating a method of outputting the image of vertical linear polarization LP1, according to an embodiment of the disclosure.

The image module 110 may provide the image of vertical linear polarization LP1. For example, when the image source 112 outputs an image having arbitrary polarization characteristics, the polarization controller 114 may convert the image output from the image source 112 into the image of vertical linear polarization LP1 and transmit the image of vertical linear polarization LP1 to be incident to the input coupler 130. The input coupler 130 may transmit the image of vertical linear polarization LP1 to be incident to the waveguide 120, and the image of vertical linear polarization LP1 may travel in the waveguide 120 through total reflection. When the image of vertical linear polarization LP1 is incident to the output coupler 140, the output coupler 140 may output the image of vertical linear polarization LP1 to the outside of the waveguide 120.

The output image of vertical linear polarization LP1 may be incident to the first ¼ wave plate 152 that may convert and output the image of vertical linear polarization LP1 into the image of right-handed circular polarization RCP. The image of right-handed circular polarization RCP may be incident to the first polarization grating 154 that may convert and output the image of right-handed circular polarization RCP into the image of left-handed circular polarization LCP. The image of left-handed circular polarization LCP may be deflected and output to the right with respect to the central axis x of the FOV expander 150.

Figure 2B:
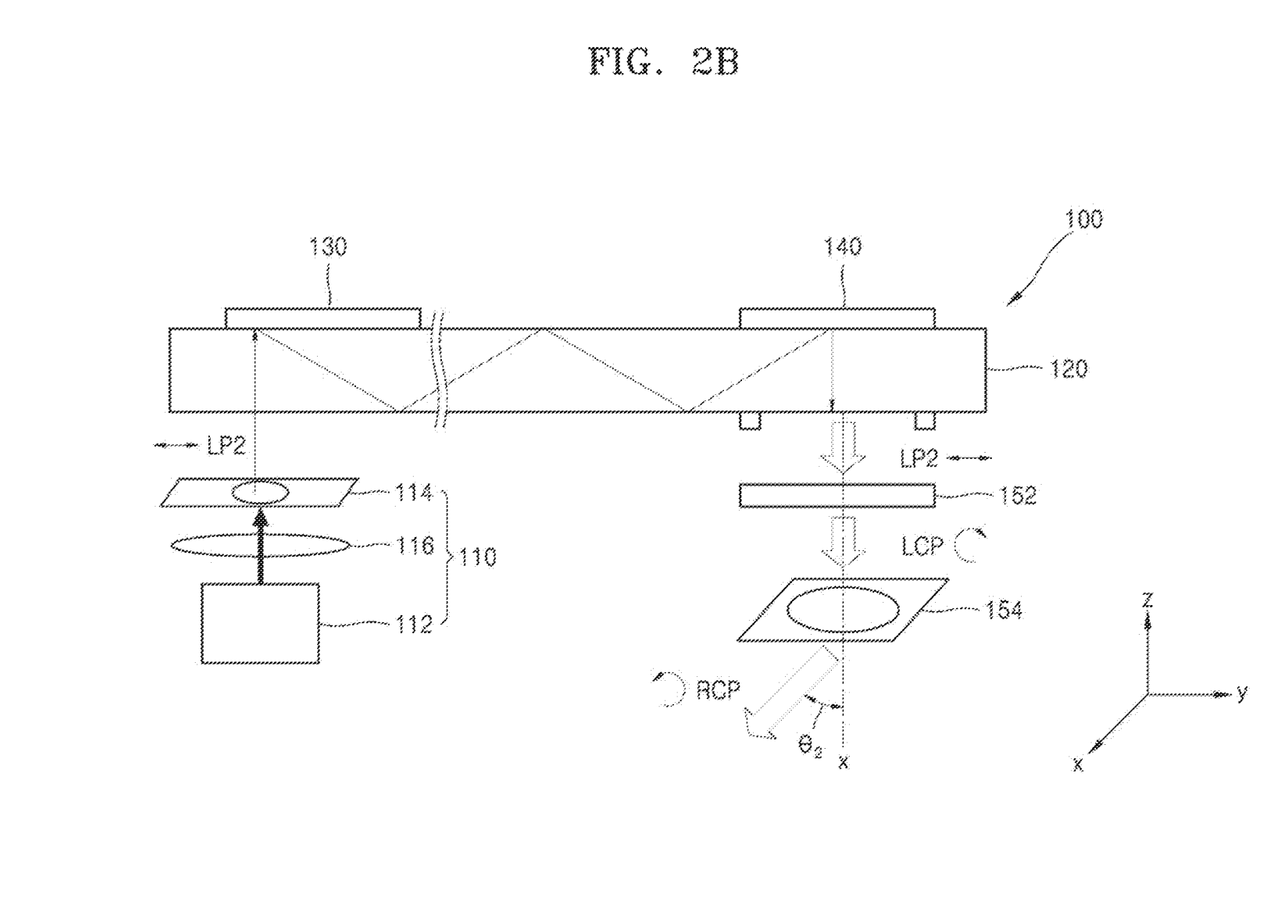
FIG. 2B is a reference diagram illustrating a method of outputting an image of horizontal linear polarization, according to an embodiment of the disclosure.

FIG. 2B is a reference diagram illustrating a method of outputting the image of horizontal linear polarization LP2, according to an embodiment of the disclosure.

The image module 110 may output the image of horizontal linear polarization LP2. For example, when the image source 112 outputs an image having arbitrary polarization characteristics, the polarization controller 114 may convert the image output from the image source 112 into the image of horizontal linear polarization LP2 and transmi the image of horizontal linear polarization LP2 to be incident to the input coupler 130. The input coupler 130 may transmit the image of horizontal linear polarization LP2 to be incident to the waveguide 120, and the image of horizontal linear polarization LP2 may travel in the waveguide 120 through total reflection. When the image of horizontal linear polarization LP2 is incident to the output coupler 140, the output coupler 140 may output the image of horizontal linear polarization LP2 to the outside of the waveguide 120.

The output image of horizontal linear polarization LP2 may be incident to the first ¼ wave plate 152 that may convert and output the image of horizontal linear polarization LP2 into the image of left-handed circular polarization LCP. The image of left-handed circular polarization LCP may be incident to the first polarization grating 154 that may convert and output the image of left-handed circular polarization LCP into the image of right-handed circular polarization RCP. The image of right-handed circular polarization RCP may be deflected and output to the left with respect to the central axis x of the FOV expander 150.

The image of left-handed circular polarization LCP is deflected to the right in FIG. 2A and the image of right-handed circular polarization RCP is deflected to the left in FIG. 2B, but embodiments are not limited thereto. For example, the first polarization grating 154 may deflect the image of right-handed circular polarization RCP to the right and deflect the image of left-handed circular polarization LCP to the left. According to another embodiment, the first polarization grating 154 may be designed to deflect the image of right-handed circular polarization RCP upwardly and deflect the image of left-handed circular polarization LCP downwardly. The deflection direction and deflection degree of the first polarization grating 154 may be determined by arrangement of liquid crystals included in the deflection grating, depending on the type of the display apparatus 100 that needs FOV expansion.

The FOV of the image incident to the FOV expander 150 may be determined by optical characteristics of the input coupler 130, the output coupler 140, the waveguide 120, etc. The image output from the FOV expander 150 may be deflected to the left and to the right and output, based on the deflection degree of the FOV expander 150. An FOV of an image into which a left-deflected image and a right-deflected image are combined may be larger than an FOV of an image incident to the FOV expander 150.

Figure 3A:
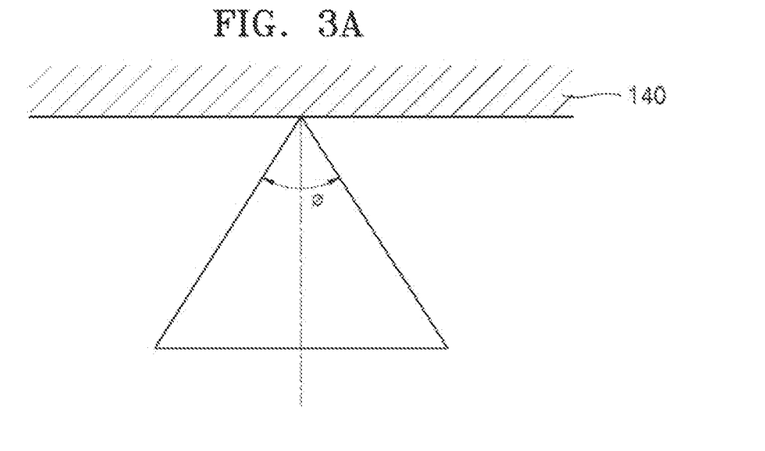
FIG. 3A is a reference diagram showing a field of view (FOV) of an image output from an output coupler, according to an embodiment of the disclosure.

FIG. 3A is a reference diagram illustrating an FOV of an image output from the output coupler 140. As shown in FIG. 3A, the image may be output at a specific FOV ø. The FOV ø may be determined by a wavelength of light corresponding to the image, the optical characteristics of the input coupler 130, the output coupler 140, the waveguide 120, etc. The FOV of the image output from the waveguide-type display device 100 may be from about 30 to about 60 degrees.

Figure 3B:
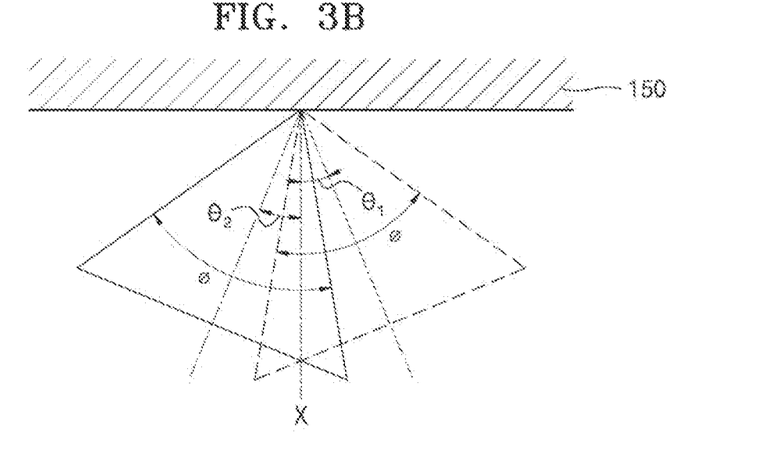
FIG. 3B is a reference diagram showing a field of view of an image output from an FOV expander according to an embodiment of the disclosure.

FIG. 3B is a reference diagram illustrating an FOV of an image output from the FOV expander 150, according to an embodiment of the disclosure. As shown in FIG. 3B, the image of vertical linear polarization LP1, output from the image module 110, may be deflected and output to the right from the FOV expander 150, and the image of horizontal linear polarization LP2 output from the image module 110 may be deflected and output to the left from the FOV expander 150.

The image module 110 alternately outputs the image of vertical linear polarization LP1 and the image of horizontal linear polarization LP2, such that the FOV expander 150 may alternately output the right-deflected image and the left-deflected image. However, when a frame rate of the image output from the image module 110 is relatively high, a user may recognize the image into which the right-deflected image and the left-deflected image are combined as one frame image. Thus, users may feel that they are watching an image with a large FOV.

The FOV of the combined image may be determined by a sum ($\theta_1+\theta_2$) of the original FOV ø of the image and a magnitude of the degree of deflection of the FOV expander 150. The sum ($\theta_1+\theta_2$) of magnitudes of deflection degrees of two deflected images may be less than or equal to the FOV ø. For example, when respective magnitudes $\theta_1$ and $\theta_2$ of the deflection degrees of the right-deflected image and the left-deflected image are half of the FOV ø, the image into which the right-deflected image and the left-deflected image are combined may not include a blank region.

Figure 3C:
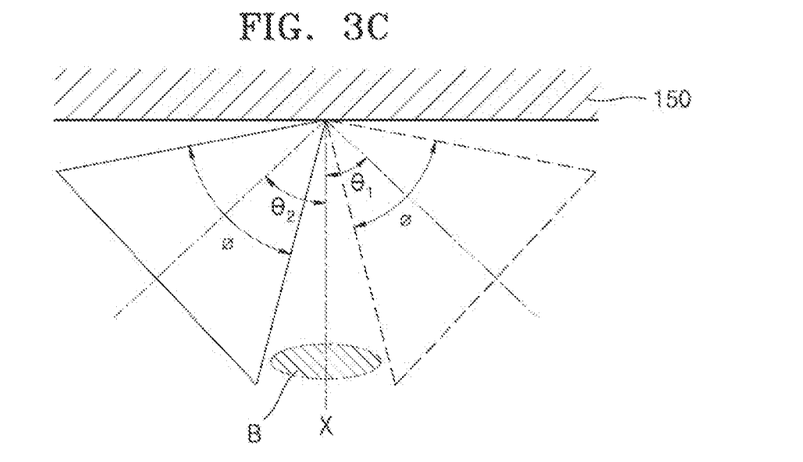
FIG. 3C is a reference diagram showing a field of view of an image output from an FOV expander according to another embodiment of the disclosure.

FIG. 3C is a reference diagram illustrating an FOV of an image output from the FOV expander 150, according to another embodiment of the disclosure. As shown in FIG. 3C, the sum ($\theta_1+\theta_2$) of the magnitudes of the deflection degrees of the two images deflected in different directions is greater than the FOV ø of the image, a blank region B may be generated between the combined images. Thus, to avoid the blank region B, the sum ($\theta_1+\theta_2$) of the magnitudes of the deflection degrees of the two deflected images should be less than or equal to the FOV ø. When the sum ($\theta_1+\theta_2$) of the magnitudes of the deflection degrees of the two deflected images is equal to the FOV ø, the two images may be output not to overlap each other.

When the sum ($\theta_1+\theta_2$) of the magnitudes of the deflection degrees of the two deflected images is less than the FOV ø, the two images may be output to partially overlap each other. Overlapping regions may appear brighter than other regions of the combined image, or image distortion and sense of difference may occur therein. Thus, the overlapping regions may be compensated for in image signal processing. For example, the overlapping regions may allow image information to be output from any one of the two deflected images and may prevent image information corresponding to the overlapping regions from being output from the other image.

While the image module 110 alternately outputs the image of vertical linear polarization LP1 and the image of horizontal linear polarization LP2 in FIG. 1, but embodiments are not limited thereto. The image module 110 may simultaneously output the image of vertical linear polarization LP1 and the image of horizontal linear polarization LP2.

Figure 4:
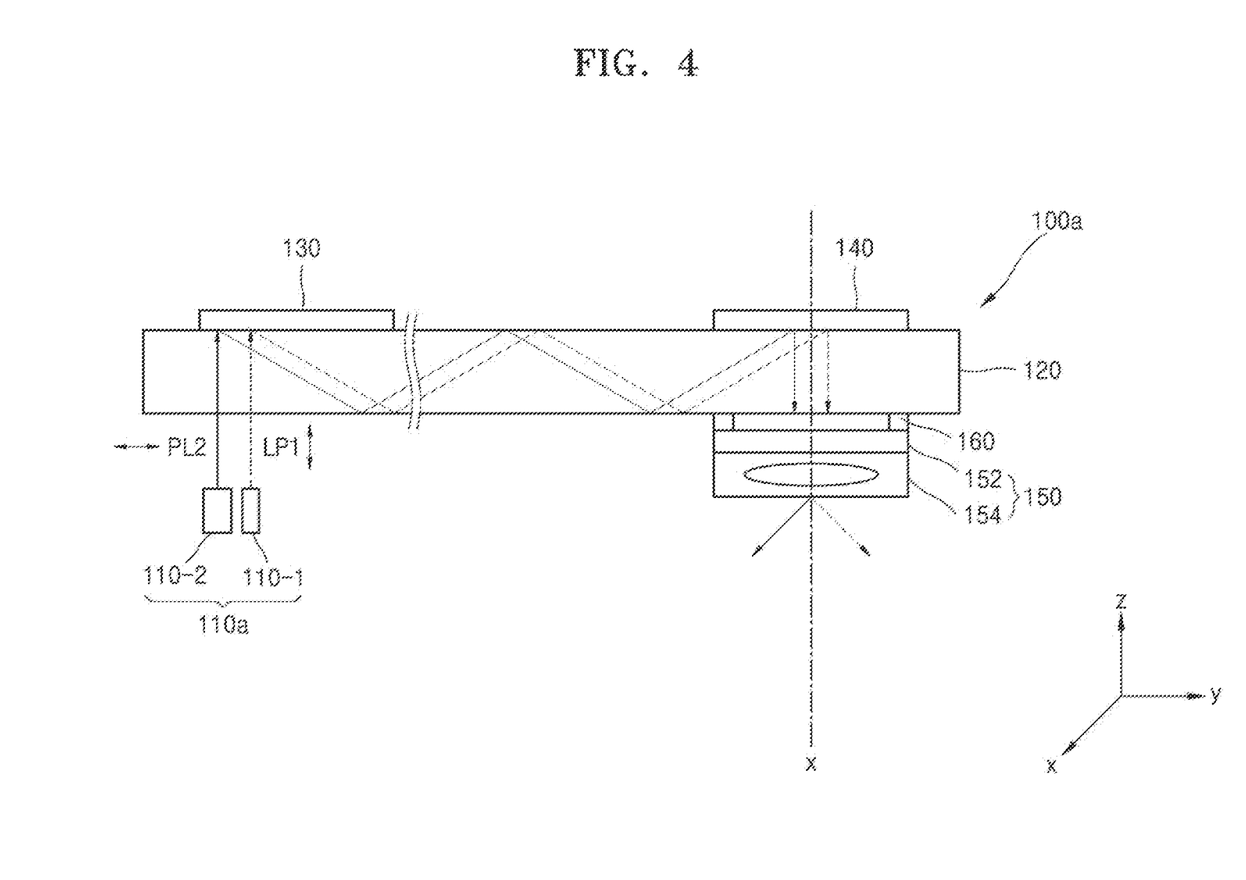
FIG. 4 is a diagram illustrating a waveguide-type display device including an image module, according to another embodiment of the disclosure.

FIG. 4 is a diagram illustrating a waveguide-type display device 100a including an image module 110a, according to another embodiment of the disclosure. Comparing FIG. 1 with FIG. 4, the image module 110a of FIG. 4 may include a plurality of image modules 110-1 and 110-2. For example, the image module 110a may include a first image module 110-1 that outputs the image of vertical linear polarization LP1 and a second image module 110-2 that outputs the image of horizontal linear polarization LP2. The first image module 110-1 and the second image module 110-2 may simultaneously output the image of vertical linear polarization LP1 and the image of horizontal linear polarization LP2, respectively. The image of vertical linear polarization LP1 and the image of horizontal linear polarization LP2 may be subframe images. For example, the image of vertical linear polarization LP1 may be a right ½ frame image, and the image of horizontal linear polarization LP2 may be a left ½ frame image. According to an embodiment, the image of vertical linear polarization LP1 may be an upper ½ frame image, and the image of horizontal linear polarization LP2 may be a lower ½ frame image.

While it is described that the first image module 110-1 and the second image module 110-2 simultaneously output images, embodiments are not limited thereto. For example, the first image module 110 and the second image module 120 may alternately output images. When the first image module 110 and the second image module 120 alternately output the images, they may perform the same function as the image module 110 described in FIG. 1.

The waveguide-type display device according to an embodiment of the disclosure may provide an image and a real environment at the same time. Light corresponding to the real environment is unpolarized, such that the light may be distorted by the FOV expander 150. Thus, the waveguide-type display device according to an embodiment of the disclosure may further include an external light compensator that compensates for distortion of the light corresponding to the real environment. Hereinbelow, the light corresponding to the real environment will be referred to as external light.

Figure 5:
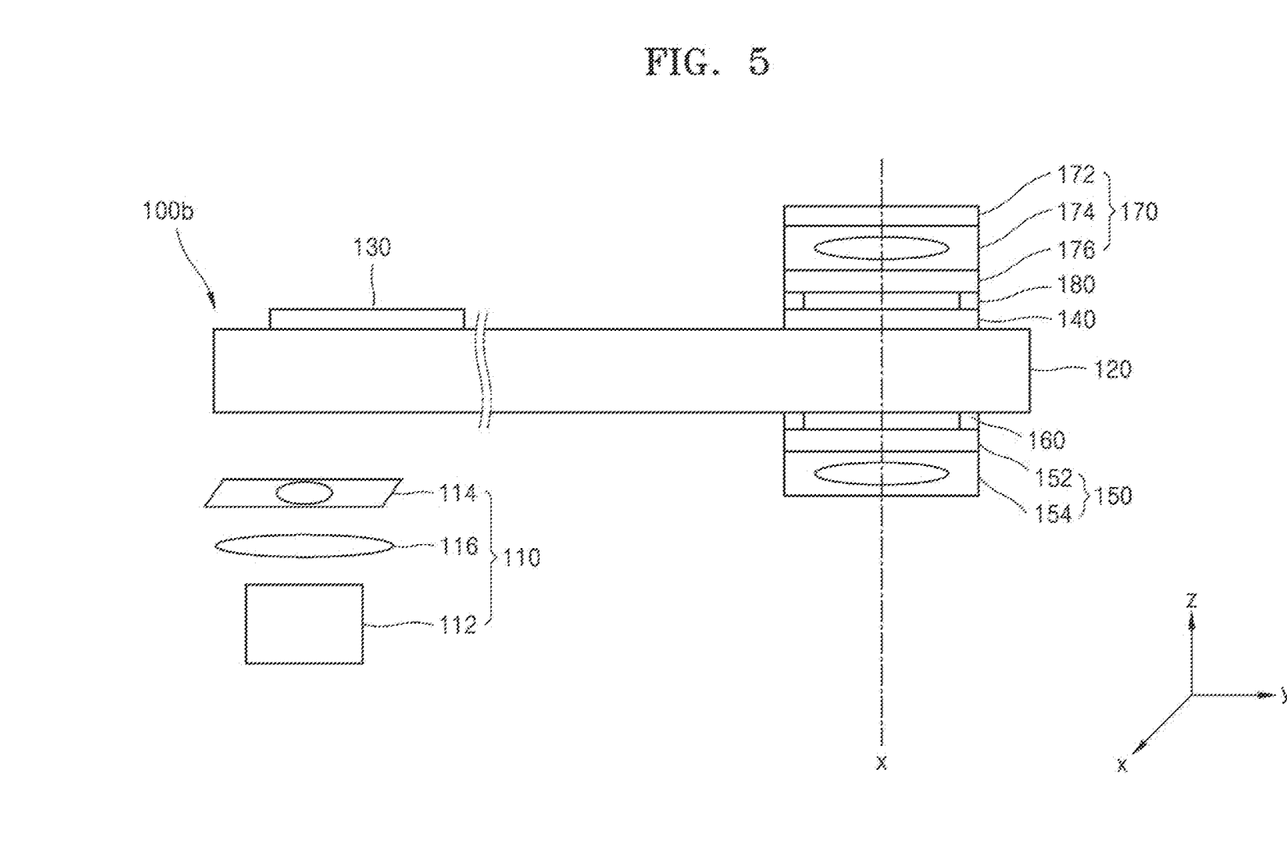
FIG. 5 is a diagram illustrating a waveguide-type display device including an external light compensator, according to an embodiment of the disclosure.

FIG. 5 is a diagram illustrating a waveguide-type display device 100b including an external light compensator 170, according to an embodiment of the disclosure. Comparing FIG. 1 with FIG. 5, the waveguide-type display device 100b may further include the external light compensator 170. The external light compensator 170 may apply light deflection in an opposite direction to the light deflection of the FOV expander 150 to the external light corresponding to the external environment. The external light compensator 170 may be arranged outside the waveguide 120 and may be arranged to overlap with the FOV expander 150 in a direction perpendicular to the longitudinal direction of a waveguide plate x. Although it is shown in FIG. 5 that the external light compensator 170 is arranged on the output coupler 140, embodiments are not limited thereto. The external light compensator 170 may be arranged on a region of the waveguide 120 where the output coupler 140 is not arranged.

The waveguide-type display device 100b may further include a spacer 180 between the external light compensator 170 and the output coupler 140 that arranges the external light compensator 170 to be spatially apart from the output coupler 140 or the waveguide 120. By arranging the external light compensator 170 to be separated from the output coupler 140 or the waveguide 120, a total reflection condition may be maintained and unwanted diffracted light that may be generated from the FOV expander 150 may be prevented.

The external light compensator 170 may include a circular polarizer 172 that converts external light into circular polarization, a second polarization grating 174 that deflects external light of circular polarization in a direction opposite to light deflection of the FOV expander 150, and a second ¼ wave plate 176 that converts the deflected external light output from the second polarization grating 174 into external light of linear polarization.

The external light may be unpolarized light traveling in all directions. Thus, the circular polarizer 172 may convert a part of external light into external light of circular polarization. For example, the circular polarizer 172 may output the part of the external light as at least one of external light of right-handed circular polarization RCP or external light of left-handed circular polarization LCP. The circular polarizer 172 may be arranged on an outer side of the external light compensator 170.

The second polarization grating 174 and the second ¼ wave plate 176 may be arranged to be symmetric to the first ¼ wave plate 152 and the first polarization grating 154 with respect to the waveguide 120. The second polarization grating 174 may have the same deflection characteristics as the first polarization grating 154, and the second ¼ wave plate 176 may have opposite polarization characteristics to the first ¼ wave plate 152. However, the deflection degree of the second polarization grating 174 may be less than or equal to that of the first polarization grating 154.

For example, the second polarization grating 174 may convert light of right-handed circular polarization RCP into light of left-handed circular polarization LCP and deflect and output the light of left-handed circular polarization LCP to the right, and may convert the light of left-handed circular polarization LCP into the light of right-handed circular polarization RCP and deflect and output the light of right-handed circular polarization RCP to the left. The second ¼ wave plate 176 may polarize light in a direction opposite to the first ¼ wave plate 152. The optical axis of the second ¼ wave plate 176 may be perpendicular to the optical axis of the first ¼ wave plate 152. For example, when the optical axis of the first ¼ wave plate 152 is +45 degrees, the optical axis of the second ¼ wave plate 176 may be −45 degrees. Thus, the second ¼ wave plate 176 may convert external light of right-handed circular polarization RCP into external light of horizontal linear polarization LP2 and convert external light of left-handed circular polarization LCP into external light of vertical linear polarization LP1.

The external light of linear polarization output from the second ¼ wave plate 176 may be incident to the first ¼ wave plate 152 through the waveguide 120. The first ¼ wave plate 152 may convert external light of linear polarization into circular polarization. The second ¼ wave plate 176 may convert external light of vertical linear polarization LP1 into external light of left-handed circular polarization LCP and convert external light of horizontal linear polarization LP2 into external light of right-handed circular polarization RCP.

The first polarization grating 154 may deflect and output incident light in a direction opposite to a deflection direction of the second polarization grating 174. For example, the first polarization grating 154 may deflect and output right-deflected external light to the left and deflect and output left-deflected external light to the right. Thus, the external light output from the first polarization grating 154 may not be deflected with respect to the central axis x of the FOV expander 150. Consequently, the external light compensator 170 may prevent light from being deflected, i.e., distorted by the FOV extender 150.

Figure 6A:
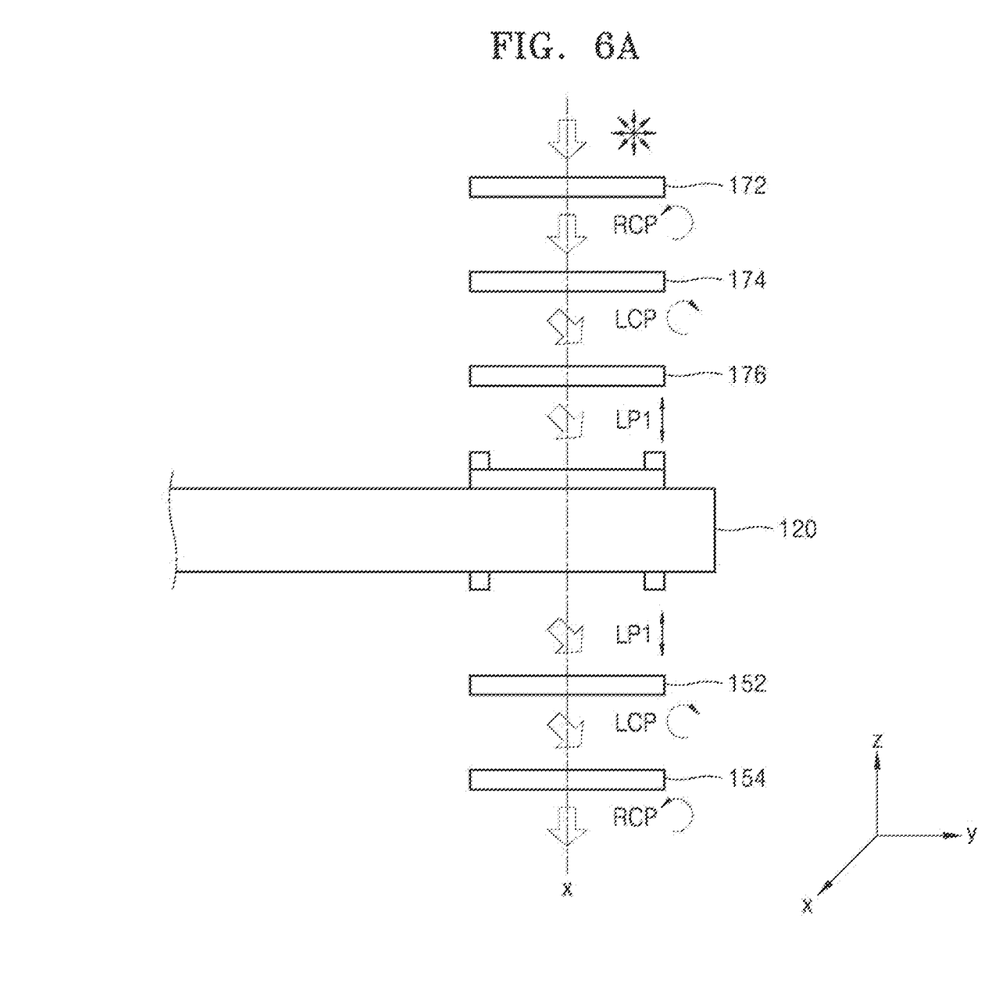
FIG. 6A is a reference diagram illustrating a traveling path of external light of right-handed circular polarization, according to an embodiment of the disclosure.

FIG. 6A is a reference diagram illustrating a traveling path of external light of right-handed circular polarization, according to an embodiment of the disclosure.

As shown in FIG. 6A, external light is unpolarized light traveling in all directions, such that the circular polarizer 172 may convert a part of the external light into external light of right-handed circular polarization RCP and output the external light of right-handed circular polarization RCP.

The second polarization grating 174 may have the same polarization characteristics as the first polarization grating 154. For example, the second polarization grating 174 may convert the light of right-handed circular polarization RCP into the light of left-handed circular polarization LCP and deflect and output the light of left-handed circular polarization LCP to the right. The deflection degree of the second polarization grating 174 may be less than or equal to that of the first polarization grating 154.

The second ¼ wave plate 176 may have optical characteristics in a direction opposite to the first ¼ wave plate 152, and the second ¼ wave plate 176 may convert the external light of left-handed circular polarization LCP into external light of vertical linear polarization LP1.

The external light of vertical linear polarization LP1 output from the second ¼ wave plate 176 may be incident to the first ¼ wave plate 152 through the waveguide 120. The first ¼ wave plate 152 may convert external light of vertical linear polarization LP1 into external light of left-handed circular polarization LCP, and the first polarization grating 154 may convert the external light of left-handed circular polarization LCP into the external light of right-handed circular polarization RCP and deflect and output the external light of right-handed circular polarization RCP to the left. The external light output from the first polarization grating 154 may not be deflected with respect to the central axis x of the FOV expander 150.

While it is described in FIG. 6A that the circular polarizer 172 outputs the external light of right-handed circular polarization RCP, but embodiments are not limited thereto. The external light of left-handed circular polarization LCP may be output.

Figure 6B:
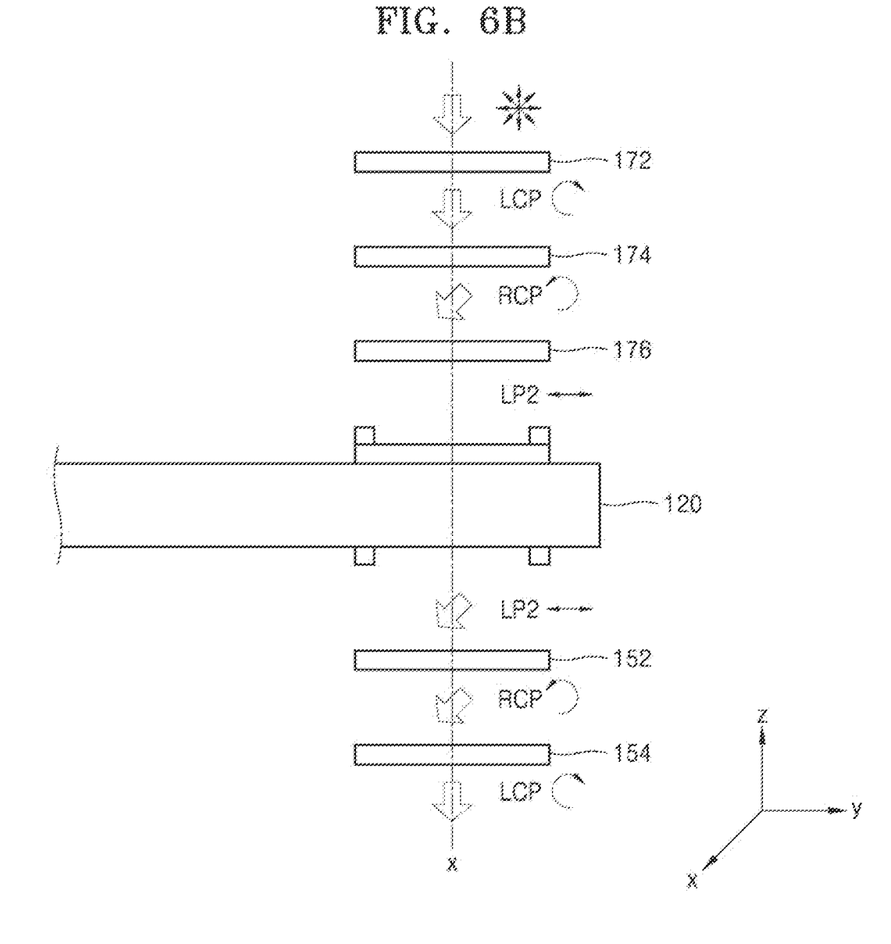
FIG. 6B is a diagram illustrating a traveling path of external light when a circular polarizer outputs external light of left-handed circular polarization, according to an embodiment of the disclosure.

FIG. 6B is a diagram illustrating a traveling path of external light when the circular polarizer 172 outputs external light of left-handed circular polarization, according to an embodiment of the disclosure. As shown in FIG. 6B, when the external light is incident, the circular polarizer 172 may convert a part of the external light into left-handed circular polarization LCP.

The second polarization grating 174 may deflect the external light of left-handed circular polarization LCP to the left with respect to the central axis x of the FOV expander 150 and convert the external light of left-handed circular polarization LCP into the external light of right-handed circular polarization RCP. Similar to the first polarization grating 154, the second polarization grating 174 may be a diffractive optical element formed by patterning a thin film having optical anisotropy, and may include liquid crystals aligned in a specific direction.

The second ¼ wave plate 176 may convert the external light of right-handed circular polarization RCP output from the second polarization grating 174 into the external light of horizontal linear polarization LP2. The optical axis of the second ¼ wave plate 176 may be perpendicular to the optical axis of the first ¼ wave plate 152.

The external light of horizontal linear polarization LP2 output from the second ¼ wave plate 176 may be incident to the first ¼ wave plate 152 through the waveguide 120. The first ¼ wave plate 152 may convert the external light of horizontal linear polarization LP2 into the external light of right-handed circular polarization RCP. The external light of right-handed circular polarization RCP may be output as the external light of left-handed circular polarization LCP while passing through the first polarization grating 154, and may be deflected to the right. The external light is deflected to the right from the second polarization grating 174 and then deflected to the right from the first polarization grating 154, the external light output from the first polarization grating 154 may not be deflected with respect to the central axis x of the FOV expander 150. Consequently, the external light compensator 170 may prevent light from being deflected, i.e., distorted by the FOV extender 150.

Although it is described that the circular polarizer 172 outputs a part of the external light as the external light of right-handed circular polarization RCP in FIG. 6A and the circular polarizer 172 outputs a part of the external light as the external light of left-handed circular polarization LCP in FIG. 6B, embodiments are not limited thereto. The circular polarizer may output the external light as the external light of left-handed circular polarization LCP and the external light of right-handed circular polarization RCP.

As such, by the external light compensator 170, the external light may be focused on an eye of a user not to be distorted.

While the waveguide-type display devices 100, 100a, and 100b according to the disclosure have been shown and described in connection with the embodiments of the disclosure to help understanding of the disclosure, it will be apparent to those of ordinary skill in the art that various modifications and other equivalent embodiments may be possible. Therefore, the true technical scope of the disclosure should be defined by the appended claims.

It should be understood that embodiments described herein should be considered in a descriptive sense only and not for purposes of limitation. Descriptions of features or aspects within each embodiment should typically be considered as available for other similar features or aspects in other embodiments.

While embodiments have been described with reference to the figures, it will be understood by those of ordinary skill in the art that various changes in form and details may be made therein without departing from the spirit and scope as defined by the following claims and their equivalents.

What is claimed is:

1. A waveguide-type display device comprising:
a waveguide;
an input coupler provided on the waveguide and configured to transmit an image to travel into the waveguide;
an output coupler provided on the waveguide and configured to output the image traveling in the waveguide to an outside of the waveguide;
a field-of-view (FOV) expander configured to output an image having an expanded FOV by deflecting and outputting the image output from the output coupler in a certain direction based on polarization characteristics of the image, the FOV expander comprising:
a first ¼ wave plate configured to convert the image output from the output coupler into an image of circular polarization; and
a first polarization grating configured to deflect and output the image of the circular polarization, output from the first ¼ wave plate, in a direction that is different from a direction of the image output from the first ¼ wave plate, based on a rotational direction of the circular polarization;
an external light compensator configured to deflect external light corresponding to an external environment, the external light compensator comprising:
a circular polarizer configured to output a portion of the external light as external light of circular polarization;
a second polarization grating configured to deflect and output the external light of the circular polarization, output from the circular polarizer; and
a second ¼ wave plate configured to convert the external light of the circular polarization, output from the second polarization grating, into external light of linear polarization and pass the external light of linear polarization through the waveguide to the FOV expander;
a first spacer between the waveguide and the FOV expander; and
a second spacer between the output coupler and the external light compensator;
wherein the circular polarizer, the second polarization grating, and the second ¼ wave plate, the second spacer, the waveguide, the first spacer, the first ¼ wave plate and the first polarization grating are arranged sequentially in a direction perpendicular to a longitudinal direction of the waveguide.

2. The waveguide-type display device of claim 1, wherein the FOV expander is further configured to deflect and output an incident image in a first direction when the incident image is of vertical linear polarization, and to deflect and output the incident image in a second direction that is different from the first direction when the incident image is of horizontal linear polarization.

3. The waveguide-type display device of claim 2, wherein the first direction and the second direction are opposite to each other with respect to a central axis of the FOV expander.

4. The waveguide-type display device of claim 1, wherein the output coupler is provided on a first surface of the waveguide, and
wherein the FOV expander is provided on a second surface opposite to the first surface of the waveguide.

5. The waveguide-type display device of claim 4, wherein at least a part of the FOV expander overlaps the output coupler in a direction perpendicular to the longitudinal direction of the waveguide.

6. The waveguide-type display device of claim 1, wherein the external light compensator is further configured to deflect the external light corresponding to the external environment in a direction opposite to light deflection of the FOV expander.

7. The waveguide-type display device of claim 6, wherein the external light compensator is provided on a first surface of the waveguide and the FOV expander is provided on a second surface of the waveguide opposite to the first surface, and
wherein the external light compensator overlaps the FOV expander in a direction perpendicular to the longitudinal direction of the waveguide.

8. The waveguide-type display device of claim 6, wherein the second polarization grating is further configured to deflect and output the external light of the circular polarization in a direction opposite to the deflection direction of the FOV expander.

9. The waveguide-type display device of claim 8, wherein a magnitude of a deflection degree of the second polarization grating is less than or equal to a magnitude of a deflection degree of the FOV expander.

10. The waveguide-type display device of claim 8, wherein the first ¼ wave plate included in the FOV expander is configured to convert light of a linear polarization into external light of a circular polarization.

11. The waveguide-type display device of claim 8, wherein the second polarization grating has a deflection angle that is same as a deflection angle of the first polarization grating included in the FOV expander.

12. The waveguide-type display device of claim 1, further comprising an image device configured to provide an image of linear polarization to the input coupler.

13. The waveguide-type display device of claim 12, wherein the image device comprises:
an image source configured to emit an image; and
a polarizer configured to alternately convert the image emitted from the image source into any one of an image of vertical linear polarization and an image of horizontal linear polarization.

14. The waveguide-type display device of claim 12, wherein the image device comprises:
a first image device configured to provide the image of vertical linear polarization; and
a second image device configured to provide the image of horizontal linear polarization.

* * * * *